Figure 1:
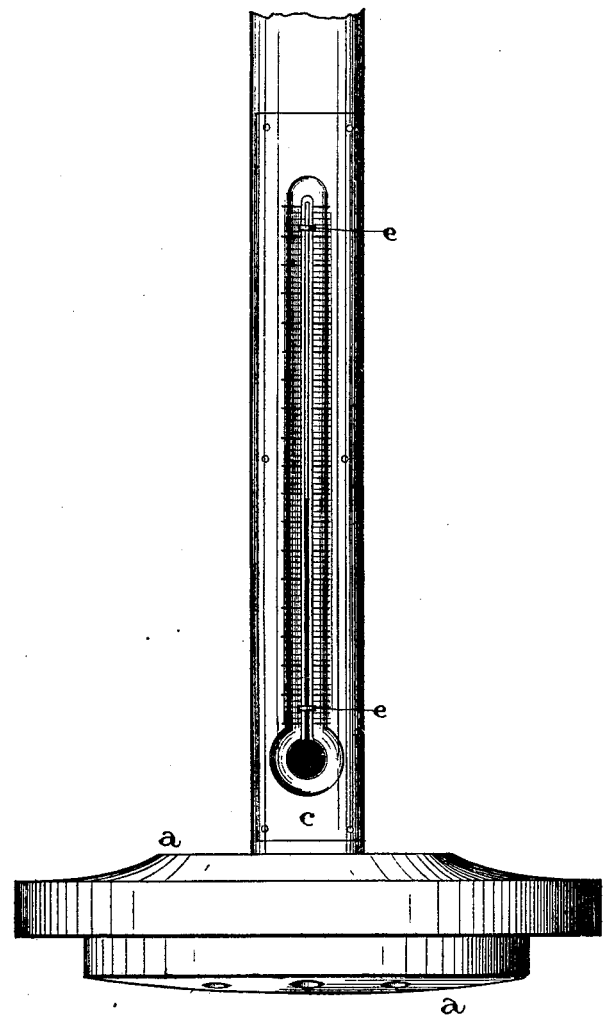
Figure 2:
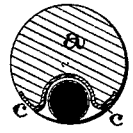

J. G. MONTGOMERY.
CHURN-DASHER.

No. 188,813. Patented March 27, 1877.

WITNESSES:

INVENTOR:

UNITED STATES PATENT OFFICE.

JOHN G. MONTGOMERY, OF SHEAKLEYVILLE, PENNSYLVANIA.

IMPROVEMENT IN CHURN-DASHERS.

Specification forming part of Letters Patent No. 188,813, dated March 27, 1877; application filed December 4, 1876.

*To all whom it may concern:*

Be it known that I, JOHN G. MONTGOMERY, of Sheakleyville, in the county of Mercer and State of Pennsylvania, have invented certain new and useful Improvements in Applying Thermometers to Churn-Dashers; and I do hereby declare the following to be a full, clear, and exact description of the invention, such as will enable others skilled in the art to which it pertains to make and use it, reference being had to the accompanying drawings, which form part of this specification.

My invention relates to an improvement in applying thermometers to churn-dashers; and it consists in stamping a deep groove in a sheet of non-corrosive metal, and making the recess at the lower end of the groove in which the bulb of the thermometer is placed sufficiently deep to allow the cream to entirely surround the bulb, whereby the exact temperature of the cream will always be indicated.

Heretofore where thermometers have been applied to dashers the bulb has been incased in some cement, so that only a portion of its front side is exposed to the cream; and hence it either does not indicate the temperature correctly, or will do so only after having been exposed to the cream for a long time.

The accompanying drawings represent my invention.

*a* represents a dasher, of any desired construction, in one side of the handle of which is a groove, cut of suitable length and depth. *c* represents a plate, of any non-corrosive sheet metal, upon which is stamped the degrees and figures of a thermometer. This plate is put in a suitable die or press, and is shaped so as to conform to the shape of the handle, and has a deep recess stamped in its face, extending nearly its whole length. The lower end of this groove or recess is made larger and deeper than any other portion of the groove, and into this end is placed the bulb of a common thermometer, which bulb nowhere comes in contact with the metal, but has a clear space all around it, so that the milk and cream will entirely surround the bulb and affect the mercury from all sides at once. The thermometer is secured in the groove in the plate by means of the metallic bands *e*, which pass around the front of the column, and then back through a hole in the plate, where they are clinched.

Heretofore where thermometers have been applied to dashers the bulb has been inserted in a mass of cement, or so concealed that the milk or cream can affect its outer side alone. Where this is the case the thermometer will only indicate the true temperature, if at all, after it has been left standing for a long time in the cream.

My invention is intended not only to obviate this trouble, but is a much cheaper and simpler manner of attaching the thermometer.

Having thus described my invention, I claim—

In combination with a churn-dasher, the handle of which has a groove in its side, the sheet-metal plate *c*, having a groove extending nearly its whole length, in which groove is placed the thermometer, and secured in position by means of the metallic bands *e*, the lower end of the said groove being enlarged out, so as to form a recess to receive the bulb of the thermometer, and allow the cream free access to it from all sides, substantially as shown and described.

In testimony that I claim the foregoing I have hereunto set my hand this 1st day of December, 1876.

JOHN G. MONTGOMERY.

Witnesses:
H. H. HOYT,
J. R. MONTGOMERY.